(12) United States Patent
Pasternak et al.

(10) Patent No.: US 11,299,240 B2
(45) Date of Patent: Apr. 12, 2022

(54) RELEASE MECHANISM AND METHOD OF USE OF SAME

(71) Applicant: Delmar Systems, Inc., Broussard, LA (US)

(72) Inventors: Jason David Pasternak, Houston, TX (US); Peter James Dorey, Vista, CA (US); Christian R. Winther, San Diego, CA (US); John Shelton, Fulshear, TX (US); Steven W. Van Bibber, El Cajon, CA (US); Michael D. Pearlman, El Cajon, CA (US)

(73) Assignee: DELMAR SYSTEMS, INC., Broussard, LA (US)

( * ) Notice: Subject to any disclaimer, the term of this patent is extended or adjusted under 35 U.S.C. 154(b) by 0 days.

(21) Appl. No.: 16/500,131

(22) PCT Filed: Apr. 7, 2018

(86) PCT No.: PCT/US2018/026634
§ 371 (c)(1),
(2) Date: Oct. 2, 2019

(87) PCT Pub. No.: WO2018/187794
PCT Pub. Date: Oct. 11, 2018

(65) Prior Publication Data
US 2021/0070400 A1    Mar. 11, 2021

Related U.S. Application Data

(60) Provisional application No. 62/483,601, filed on Apr. 10, 2017, provisional application No. 62/483,050, filed on Apr. 7, 2017.

(51) Int. Cl.
*B63B 21/20* (2006.01)
*F16G 15/04* (2006.01)
*B63B 21/00* (2006.01)

(52) U.S. Cl.
CPC .............. *B63B 21/20* (2013.01); *F16G 15/04* (2013.01); *B63B 2021/004* (2013.01); *B63B 2021/203* (2013.01)

(58) Field of Classification Search
CPC .............. B63B 21/20; B63B 2021/004; B63B 2021/203; B63B 2021/007; B63B 21/08; F16G 15/04
See application file for complete search history.

(56) References Cited

U.S. PATENT DOCUMENTS

| | | |
|---|---|---|
| 3,430,305 A | 3/1969 | Geffner |
| 3,749,933 A | 7/1973 | Davidson |

(Continued)

OTHER PUBLICATIONS

United States Patent and Trademark Office as International Search Authority, International Search Report and Written Opinion for PCT/US2018/026634, dated Oct. 30, 2018, all pages, Alexandria, VA, US.

*Primary Examiner* — Anthony D Wiest
(74) *Attorney, Agent, or Firm* — Law Office of Jesse D. Lambert, LLC

(57) ABSTRACT

A release mechanism for separating sections of mooring lines has a main body with two separable first and second halves or sections. A hydraulic assembly within the main body is controlled by an acoustic system, and moves a rod and button so as to move locking shoes within the main body. The locking shoes hold the first and second sections locked together, or alternatively release them to disconnect the mooring line. In addition to the acoustically controlled hydraulic assembly, the release mechanism has a mechanical disconnect, which is operated by pulling the release mechanism into a chain fairlead or the like, or by pulling an encircling member such as a trigger sleeve into the release (Continued)

mechanism. The release mechanism may include instrumentation to transmit various operating conditions of the release mechanism when in use.

26 Claims, 18 Drawing Sheets

(56) References Cited

U.S. PATENT DOCUMENTS

| | | | |
|---|---|---|---|
| 3,848,226 | A | 11/1974 | Perez |
| 3,905,190 | A | 9/1975 | Pearlman |
| 4,067,282 | A | 1/1978 | Guinn et al. |
| 7,034,680 | B2 | 4/2006 | Grunder |
| 8,381,383 | B2 | 2/2013 | Smith et al. |
| 8,675,446 | B2 | 3/2014 | Gateman et al. |
| 9,651,374 | B1 | 5/2017 | Wingo et al. |
| 2010/0024706 | A1 | 2/2010 | Foo et al. |
| 2013/0279298 | A1 | 10/2013 | Prentice et al. |
| 2015/0158555 | A1* | 6/2015 | Pasternak ............... F16G 15/04 114/230.3 |

* cited by examiner

RELEASE MECHANISM AND METHOD OF USE OF SAME

CROSS REFERENCE TO RELATED APPLICATIONS

This non-provisional patent application claims priority to U.S. provisional patent application Ser No. 62/483,050, filed Apr. 7, 2017, and Ser. No. 62/483,601, filed Apr. 10, 2017, for all purposes. The disclosures of those provisional patent applications are incorporated herein by reference, to the extent not inconsistent with this disclosure.

BACKGROUND

This United States patent application relates to subsea release mechanisms used as components of mooring systems, for example to connect sections of mooring lines, chain, cable, etc., to one another, and/or to anchors of different types.

Reference is made to U.S. Pat. No. 3,905,190, which discloses one embodiment of a prior art release mechanism. The release mechanism disclosed in U.S. Pat. No. 3,905,190 is releasable only by means of a predetermined acoustic command signal actuating a mechanism which moves a locking means from a first, locked position to a second, unlocked position. No option is provided for a mechanical release of the release mechanism, for example in the event of a failure of the acoustic signal-based system. In addition to an acoustic signal-based system, it is desired to provide a release mechanism which comprises a release system actuable by mechanical means.

In addition, it is desirable for a release mechanism to comprise sensors and communication apparatus that detect and report information such as strain (tensile force) on the connector; the depth that the release mechanism is deployed at; and the angle (measured from a datum, e.g. a vertical or horizontal line) at which the release mechanism is deployed. These types of information are by way of example only.

SUMMARY OF A RELEASE MECHANISM EMBODYING THE PRINCIPLES OF THE INVENTION

An apparatus and method embodying the principles of the present invention is disclosed. A release mechanism, suitable for joining lengths of heavy mooring lines, such as chain or cable, comprises a main body with separable or disconnectable first and second halves or sections. A number of locking shoes engage a generally radially positioned flange within each of the first and second sections, proximal the line of disconnection between the two sections. The locking shoes have radial grooved surfaces for engaging the flanges, and when engaged the locking shoes bridge the line of disconnection and lock the two sections together. An acoustically operated hydraulic system moves a piston shaft, and a cam surface or button is positioned on the piston shaft. The button is movable between two positions. In a first, locked position, the button is positioned (with the shaft extended) so as to force the locking shoes into engagement with the flanges, thereby locking the first and second sections together. In a second, unlocked position, the button is longitudinally moved (the shaft retracted) so as to rotate the locking shoes about a grooved surface, and bring the locking shoes out of engagement with the flanges and thereby permitting the two sections to disconnect. In addition to the acoustically operated disconnect system, a mechanical disconnect system comprising a plurality of trigger rods is provided. The trigger rods are movable longitudinally along the main body, and are movable by pulling the release mechanism into (for example) a fairlead on a floating drilling rig or similar structure, with or without an intervening member such as a trigger sleeve between the release mechanism and the chain fairlead; or by pulling a trigger sleeve or ring member (pulled by a vessel) over the release mechanism and contacting the trigger rods. The trigger rods push on and rotate a plurality of trigger arms, which in turn bear on a button extension plate connected to the button. Rotation of the trigger arms moves the button in the same manner as when moved by the hydraulic system, namely, pushing it back to its second, unlocked position, and rotates the locking shoes so as to release the two sections as described above. Different embodiments of the mechanical system are disclosed.

In addition, the release mechanism may comprise a plurality of elements and sensors which acquire, store, and transmit, via telemetry, data regarding the release mechanism and the mooring assembly, including but not limited to strain (tension) at the release mechanism; depth of the release mechanism; and tilt or angle of the release mechanism/mooring line assembly.

Multiple sensors measure the data and store the data in a data acquisition unit located in the release mechanism. The data is transmitted via one or more, preferably two, underwater acoustic modems (topside and subsea) to a topside digital processor (i.e. PC computer) located on a vessel, which may be the moored vessel, typically in a control room.

Software running on the digital processor implements telemetry command and control functions as appropriate. Data received from each release mechanism (a given system typically comprises multiple release mechanisms) is reformatted and transmitted to a visualization system.

RELEASE MECHANISM APPARATUS

Several possible and presently preferred embodiments of the release mechanism, embodying the principles of the present invention, are disclosed. Certain aspects of the various elements of the release mechanism are common to all presently preferred embodiments, and where applicable the following descriptions will reference those common elements, and additionally describe the additional elements in the various embodiments.

Figure 1:
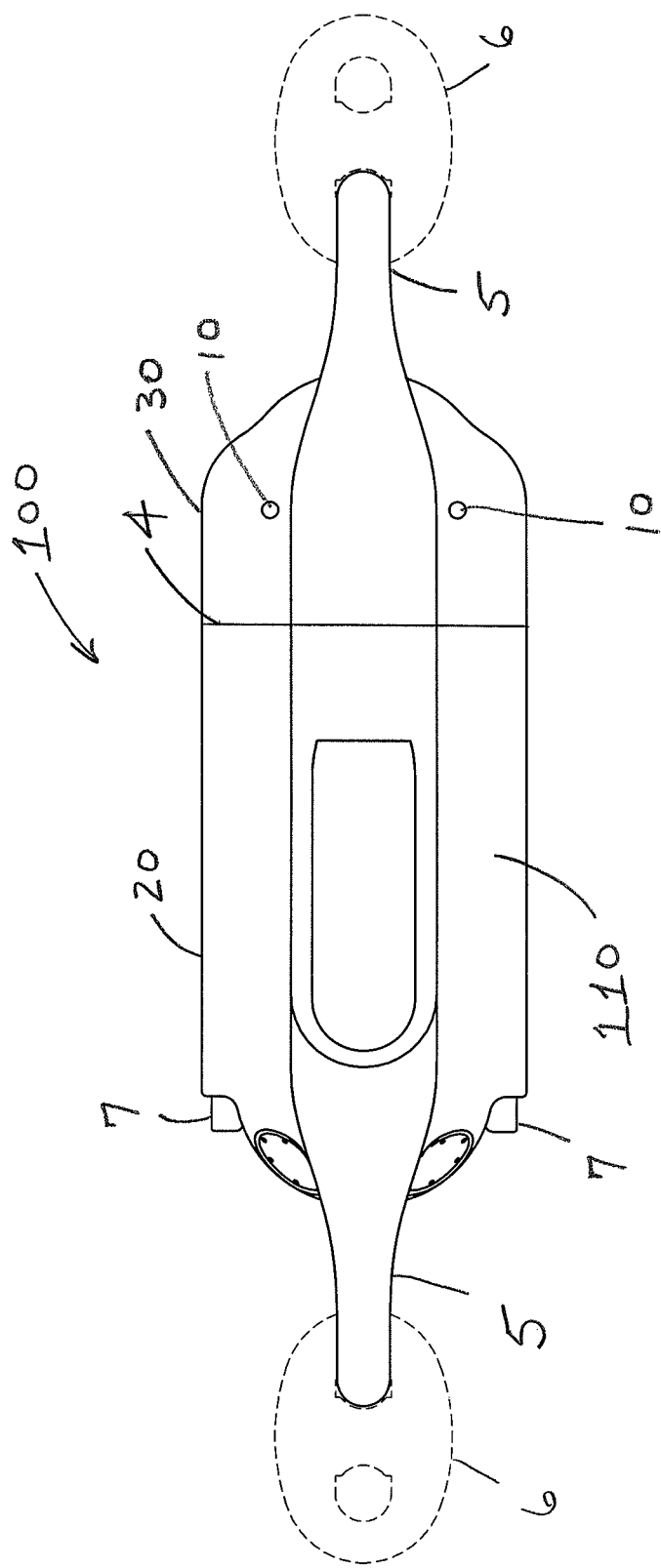
FIGS. 1 and 2 are external views of a release mechanism embodying the principles of the present invention.

As can be seen in FIG. 1, which is an external side view of release mechanism 100, release mechanism 100 comprises a generally elongated main body 110, having padeyes 5 or other openings or means of fixing or attachment on both ends thereof. Mooring shackles 6 or similar connecting apparatus are usually provided, to enable connection of release mechanism 100 within a mooring line assembly. Main body 110 comprises first and second body sections 20 and 30, which are separable or disconnectable from one another along a line of disconnection indicated at 4. It is understood that one of first and second sections 20 and 30 is attached to one mooring line (chain, cable, etc.) section, with the other body section attached to another mooring line section; when first and second body sections 20 and 30 are disconnected, the mooring line assembly is thereby separated, hence the moored object is disconnected from its mooring.

Also seen in FIG. 1 are outwardly protruding ends of trigger rods 7, described in more detail below; and shafts 10 on which trigger arms 9 rotate, also described in more detail below.

Figure 2:
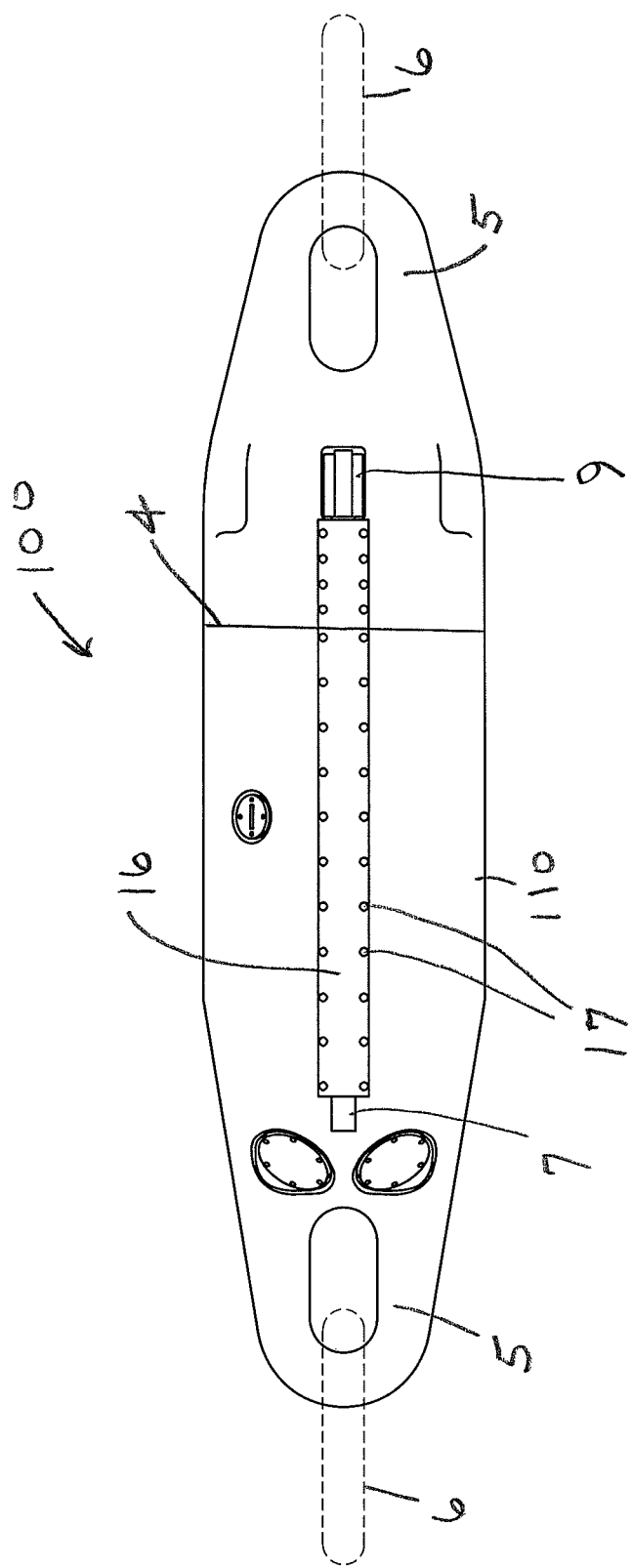

FIG. 2 is a second external side view of release mechanism 100, rotated substantially 90 degrees around a longitudinal axis from the position of FIG. 1. Certain elements seen in FIG. 2 are addressed above regarding FIG. 1. Of note in FIG. 2 are cover plates 16 within which trigger rods 7 (and trigger rods 8, described in more detail below) move longitudinally, which are mounted to main body 110 typically by bolts 17. A portion of trigger arms 9 can also be seen in FIG. 2.

Main body 110 is preferably formed of metal, by methods known in the relevant art, and of suitable dimensions and strengths to withstand the very high loads placed on subsea mooring components.

A First Embodiment

Figure 3:
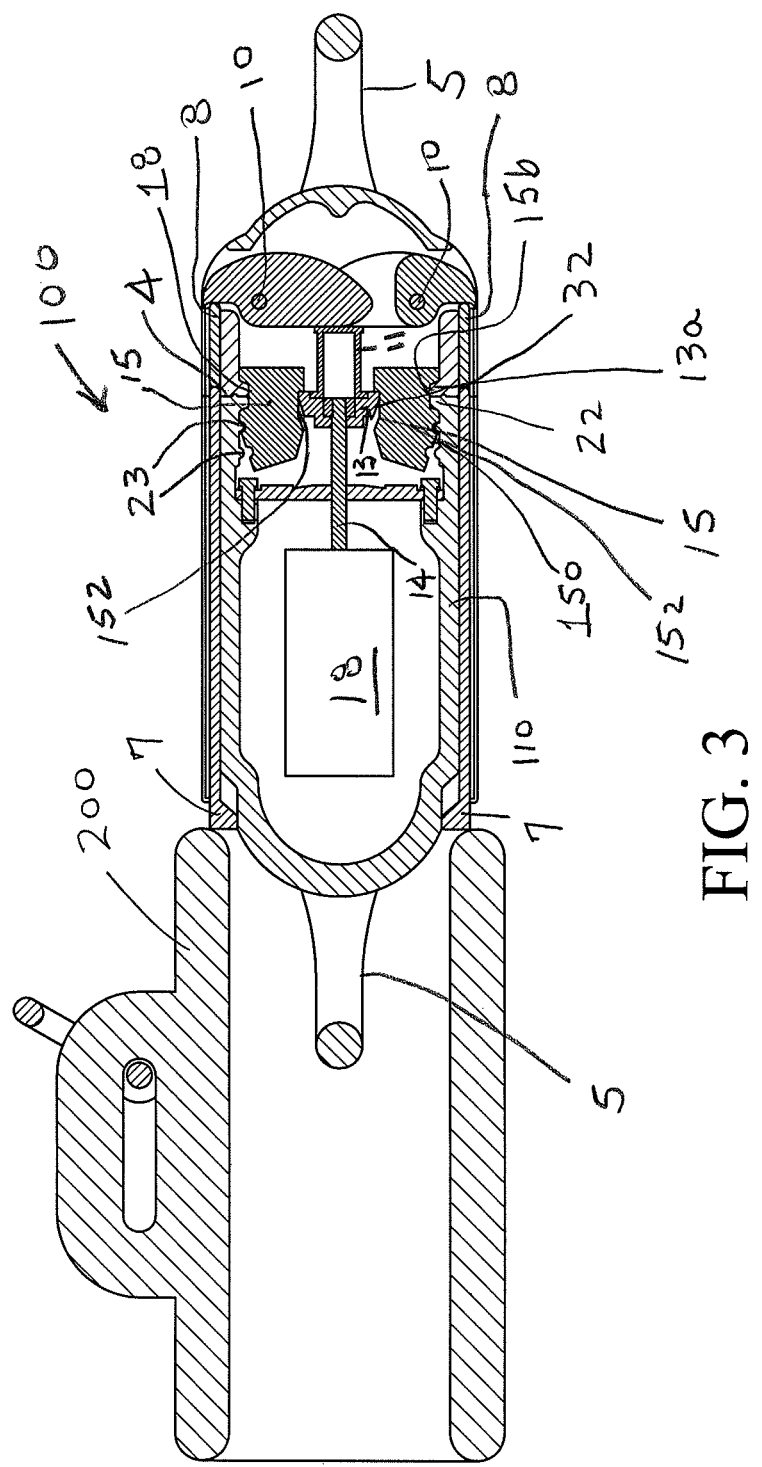
FIGS. 3 and 4 are cross sections of a first embodiment of a release mechanism embodying the principles of the present invention.
Figure 4:
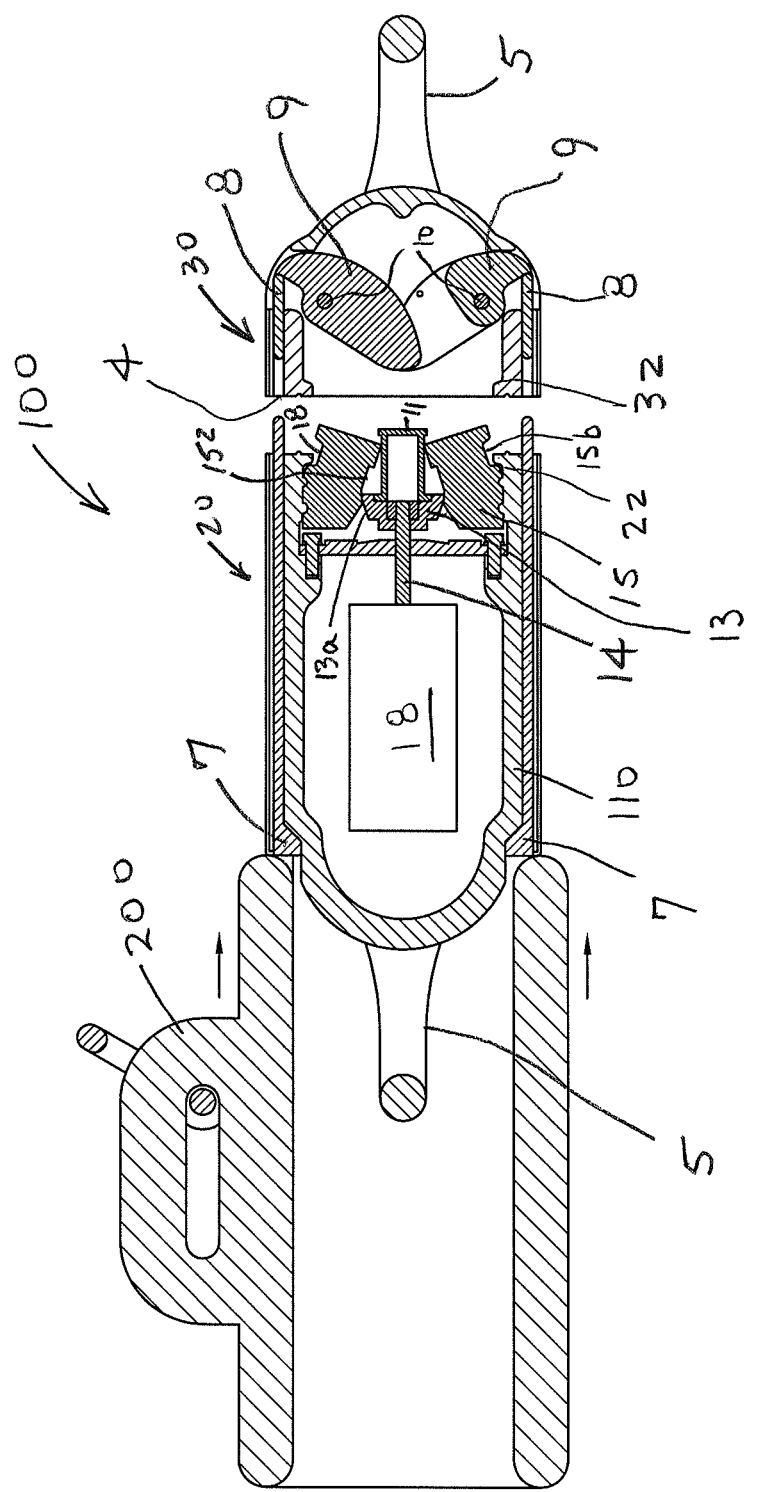

FIGS. 3 and 4 are cross section views of a first embodiment of release mechanism 100. Several elements can be seen and are annotated consistent with FIGS. 1 and 2. FIG. 3 shows release mechanism 100 in a joined-together or connected position; FIG. 4 shows release mechanism in a released or disconnected position.

With reference to FIGS. 3 and 4, first and second body sections 20 and 30 each comprise generally radially positioned flanges 22 and 32 proximal the mating ends of each of the two sections. Additional internally raised radial ribs 23 are provided within first section 20. A plurality of locking shoes 15 are positioned within main body 110. Locking shoes 15 comprise radial surfaces or grooves 15b for engaging flanges 22 and 32, and when so engaged locking shoes 15 bridge the line of disconnection 4 and hold first and second sections 20 and 30 together, thereby holding release mechanism 100 in its connected position. The outer surfaces 150 of locking shoes 15 are generally curved so as to "rock" within main body 110 into and out of their engagement with flanges 22 and 32 and ribs 23. In addition, an internal curved profile 152 on locking shoes 15 cooperates with an outer curved surface on button 13, as will be described below, to either force locking shoes 15 to remain in a first locked position (when button 13 is in a first position), or to allow locking shoes 15 to rock to a second, disengaged or unlocked position (when button 13 is in a second position) and disconnect first and second sections of release mechanism 100.

Release mechanism 100 comprises an internal assembly 18, shown in simplified and schematical form, comprising a piston, gears, or other hydraulic or mechanical means to provide a force on shaft 14, biasing shaft 14 toward a first (outward) position shown in FIG. 3. Shaft 14 is connected to cam surface or button 13. With button 13 in its first position as in FIG. 3, extended from internal assembly 18, the exterior cam surface 13a on button 13 is in contact with the inner curved surface 152 of locking shoes 15, keeping locking shoes 15 also in a first, locked position as in FIG. 3. In this first, locked position, as noted above, grooves 15b in locking shoes 15 engage flanges 22 and 32 on first and second sections 20 and 30. With locking shoes 15 so engaged, and bridging the line of disconnection 4 between first and second body sections 20 and 30, it can be understood that first and second body sections 20 and 30 are locked together and release mechanism 100 is prevented from separating into first and second sections 20 and 30. Applicant references U.S. Pat. No. 3,905,190 for its disclosure of a related release mechanism, and incorporates the disclosure of that patent by reference, to the extent not inconsistent herewith.

As disclosed in U.S. Pat. No. 3,905,190, internal assembly 18 can be operated by an acoustically operated system, and rod 14 and button 13 moved so as to disconnect release mechanism 100 by acoustic means.

With reference to FIGS. 3 and 4, in a presently preferred embodiment release mechanism 100 further comprises one or more, preferably a plurality of trigger rods 7 and 8, which in a presently preferred embodiment each comprise the two segments 7 and 8, mounted on main body 10 so as to be longitudinally movable therein, for example within cover plates 16 as described above. The two segments 7, 8 of each trigger rod permit transmitting force across the line of disconnection 4, while allowing disconnection of the two sections 20 and 30 of main body 110. As described in more detail below, referring to FIG. 4, the force exerted by internal assembly 18 on button 13, tending to keep button 13 in its first position and locking shoes 15 engaged with grooves 22, 32, is overcome when trigger rods 7 and 8 are pushed along main body 110 of release mechanism 100, which may result from trigger rods 7 and 8 being pushed by an apparatus such as trigger sleeve 200 as in FIG. 3, or by pulling release mechanism into a chain fairlead or the like, as will be later described in more detail. Fundamentally, trigger rods 7 and 8 are moved relative to main body 110.

Release mechanism 100 further comprises a plurality of trigger arms 9, as shown in FIG. 4, which are rotatably mounted on shafts 10 within main body 110. One end of trigger rods 8 are in contact with a side of one of trigger arms 9 on one side of the point of rotation. The other side or end of each trigger arm 9 is positioned so as to bear on button extension 11, which is operably connected to button 13.

Referring especially to FIG. 4, longitudinal movement of trigger rods 7 and 8 pushes on trigger arms 9, thereby pivoting trigger arms 9 around shafts 10 so that trigger arms 9 push on the button extension 11 and attached button 13. Button 13 and shaft 14 then move from their first position to a second position as shown in FIG. 4, and the outer cam surface 13a on button 13 and the inner surfaces 152 of locking shoes 15 cooperate in such a manner as to rotate locking shoes 15 and move them to their second, unlocked position, as seen in FIG. 4. Locking shoes 15 are thereby disengaged from flanges 22 and 32 of first and second body sections 20 and 30, freeing first and second sections 20 and 30 from one another. Disconnection of the two sections of the mooring line is thereby achieved. Movement of trigger rods 7 and 8 may be by trigger sleeve 200 or other apparatus, and methods of its use are described in more detail below, in addition to other methods of mechanical actuation of the release mechanism. It is understood that trigger arms 9 may take a variety of shapes and forms, including but not limited to rods, plates, pins, cast or forged bodies, etc.

A Second Embodiment

Figure 5:
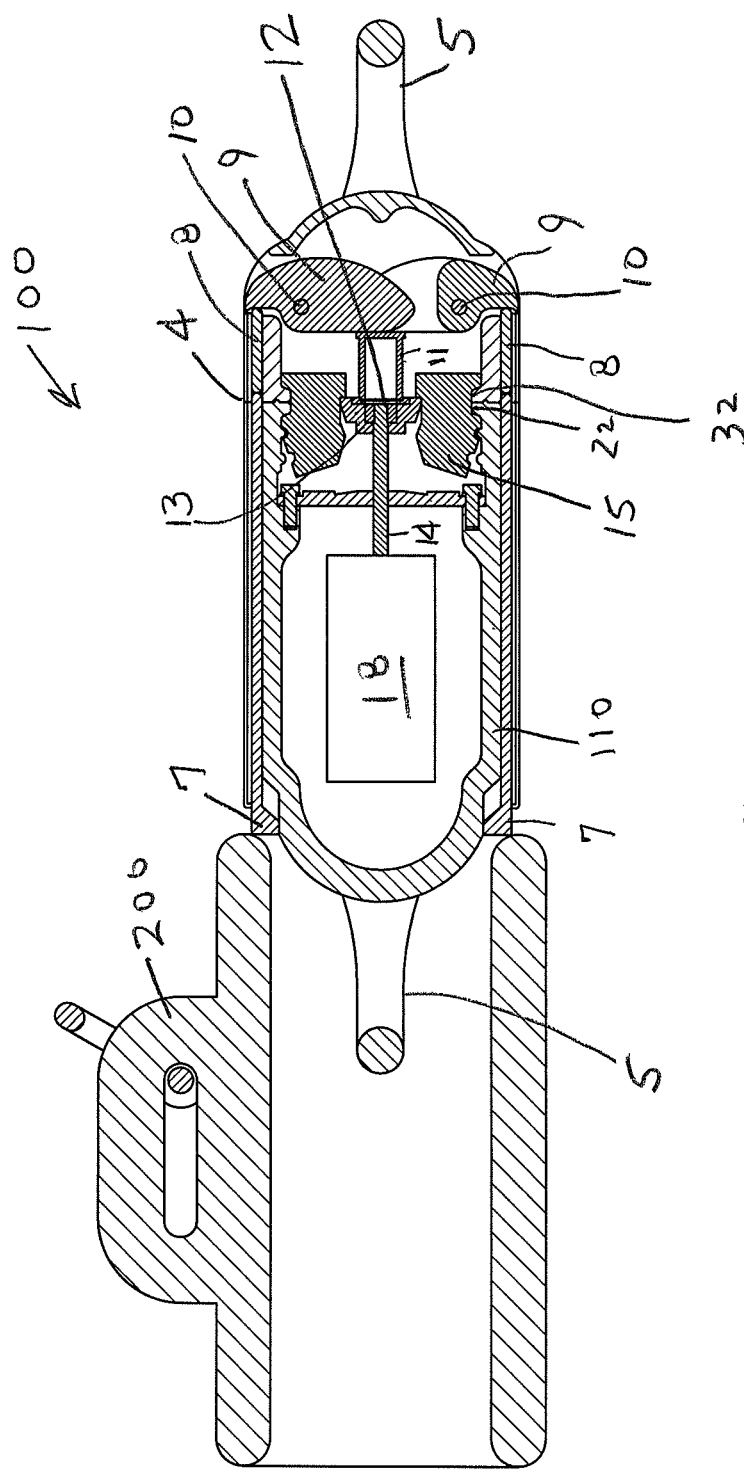
FIGS. 5 and 6 are cross section views of a second embodiment of a release mechanism embodying the principles of the present invention.
Figure 6:
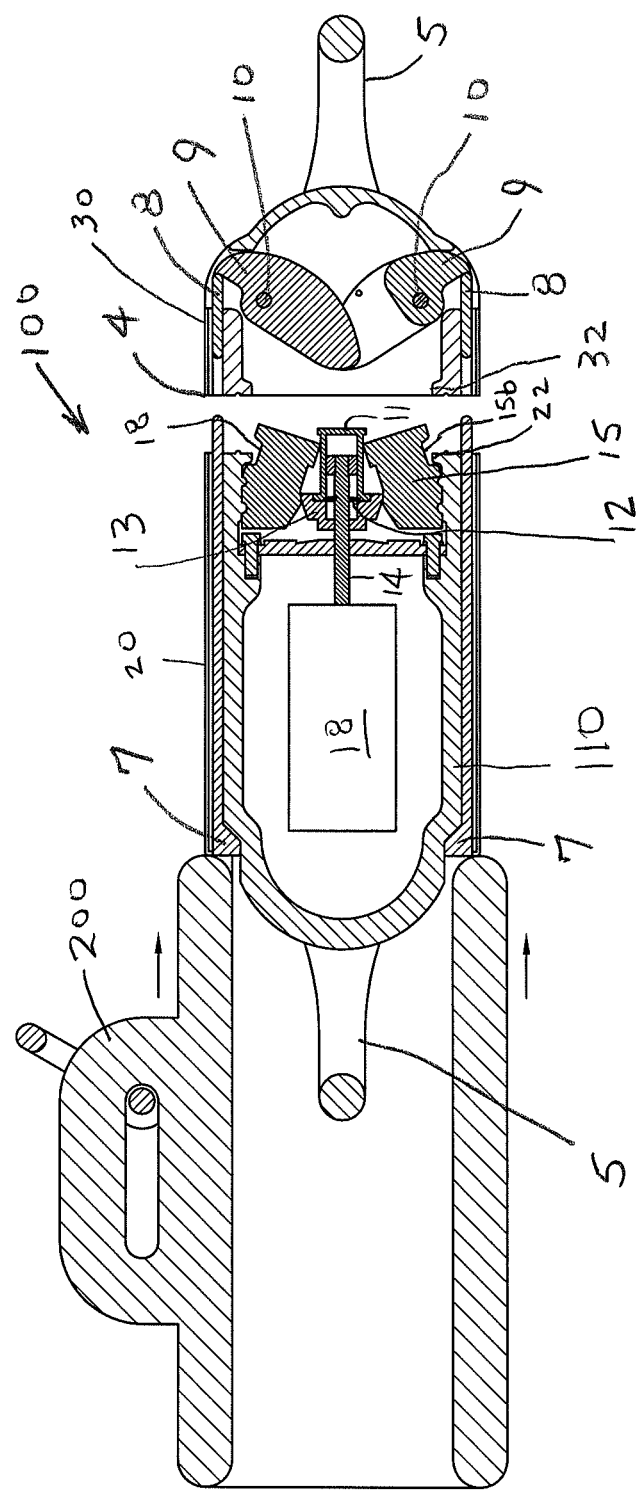

A second embodiment of the release mechanism, embodying the principles of the present invention, is shown in FIGS. 5-6. This embodiment shares many of the structural elements with the embodiment disclosed in FIGS. 1-4 and described above; notably, the second embodiment in FIGS. 5-6 further comprises a pinned, shear plate-equipped or otherwise shearable connection between button extension 11 and button 13, the shearing of the pinned or otherwise shearable connection permitting button extension 11 and button 13 to move to the second, unlocked position, while shaft 14 remains substantially in its first position. Certain of the element numerals are omitted from FIGS. 4 and 5 for clarity.

Referring to FIG. 5, shaft 14 is connected to button 13 by a shearable element, for example a bolt, sheet, pin or plate 12. Shear plate 12 permits force to be transmitted to button 13, maintaining button 13 in a first or locked position. As described above, with button 13 in its first position, as in FIG. 5, locking shoes 15 cannot rotate out of their locked position, thereby the two sections 20, 30 of main body 100 are locked together. It is to be understood that the term shear plate is meant in its broadest fashion, to encompass any form of shearable element, including but not limited to a bolt, sheet, pin, plate or similar shearable element.

In this embodiment, the retaining force provided by internal assembly 18, transmitted through shaft 14 and shear plate 12, is overcome when trigger rods 7 and 8 are pushed into the body of release mechanism 100, pivoting trigger arms 9 which push button extension 11 and attached button 13 with sufficient force to shear shear plate 12 and disconnect button from shaft 14, permitting button 13 to move relative to shaft 14. Button 13 then moves toward a second, unlocked position, as seen in FIG. 6, which in turn allows locking shoes 15 to rotate to their unlocked position, freeing first and second halves 20 and 30 of the device from one another. As can be seen from the drawings, button 13 moves to its second, unlocked position while shaft 14 remains substantially in its first position.

As with the first embodiment above, trigger rods 7 and 8 may be pushed by trigger sleeve 200 or another alternative element, or by release mechanism 100 being pulled into a chain fairlead or the like, as described below.

A Third Embodiment

Figure 7:
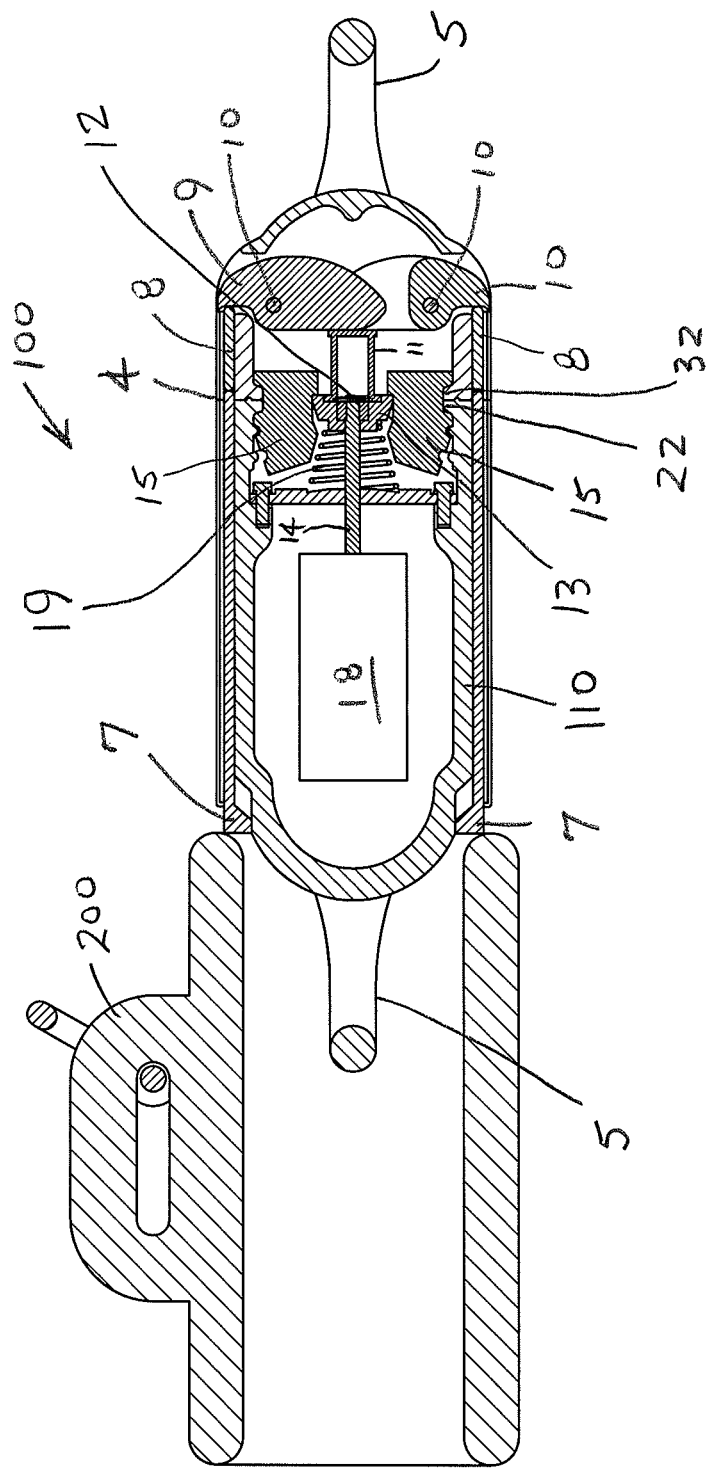
FIGS. 7 and 8 are cross section views of a third embodiment of a release mechanism embodying the principles of the present invention.
Figure 8:
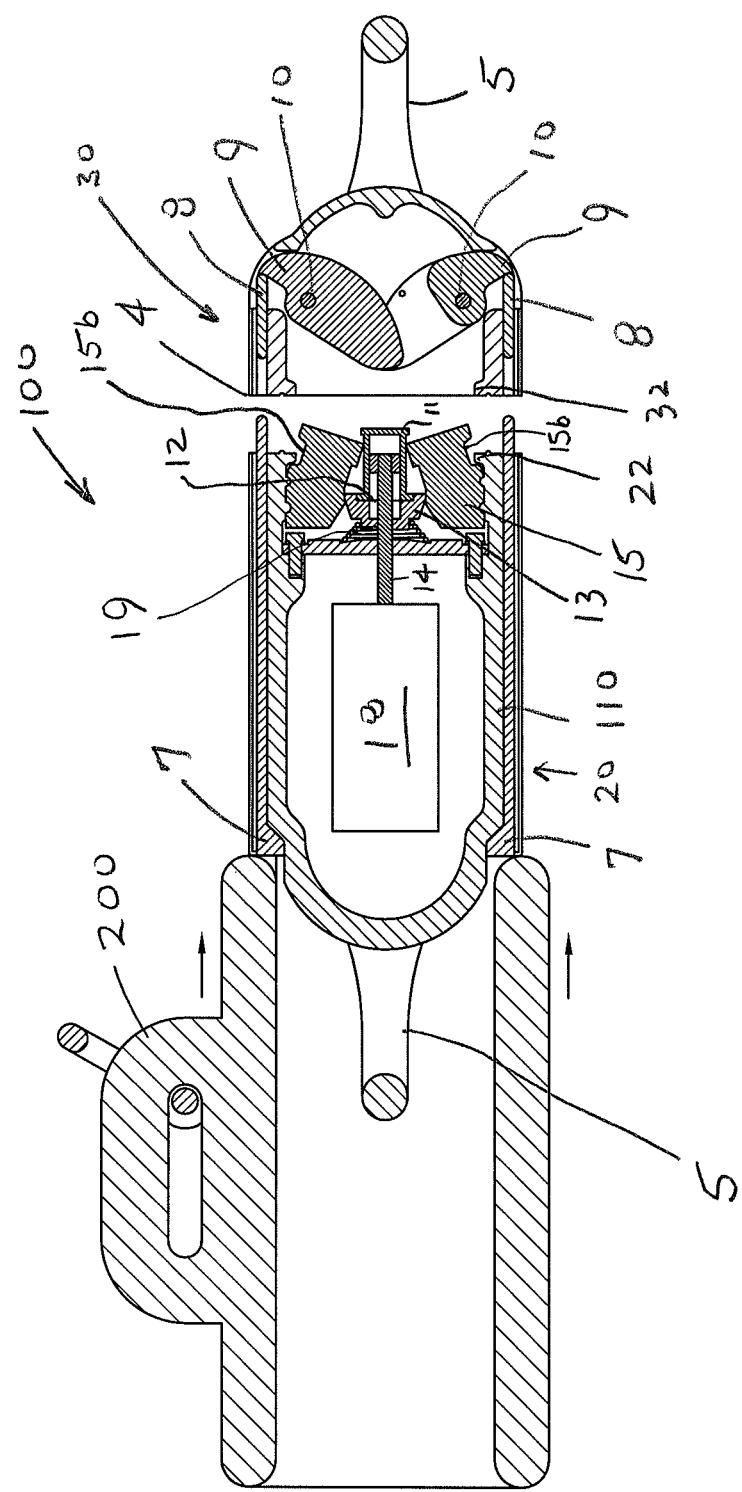
Figure 9:
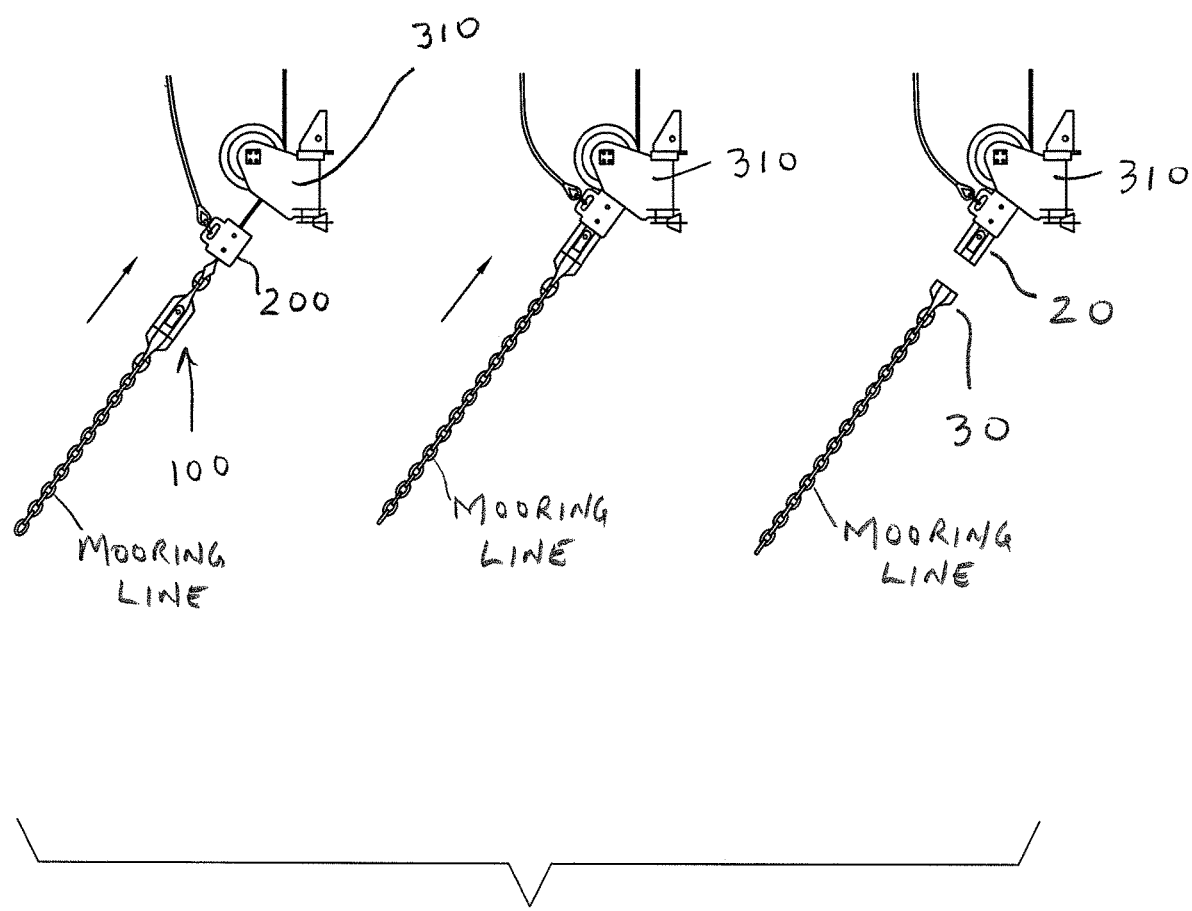
FIGS. 9 through 15 show a method of deployment of a release mechanism of the present invention.
Figure 10:
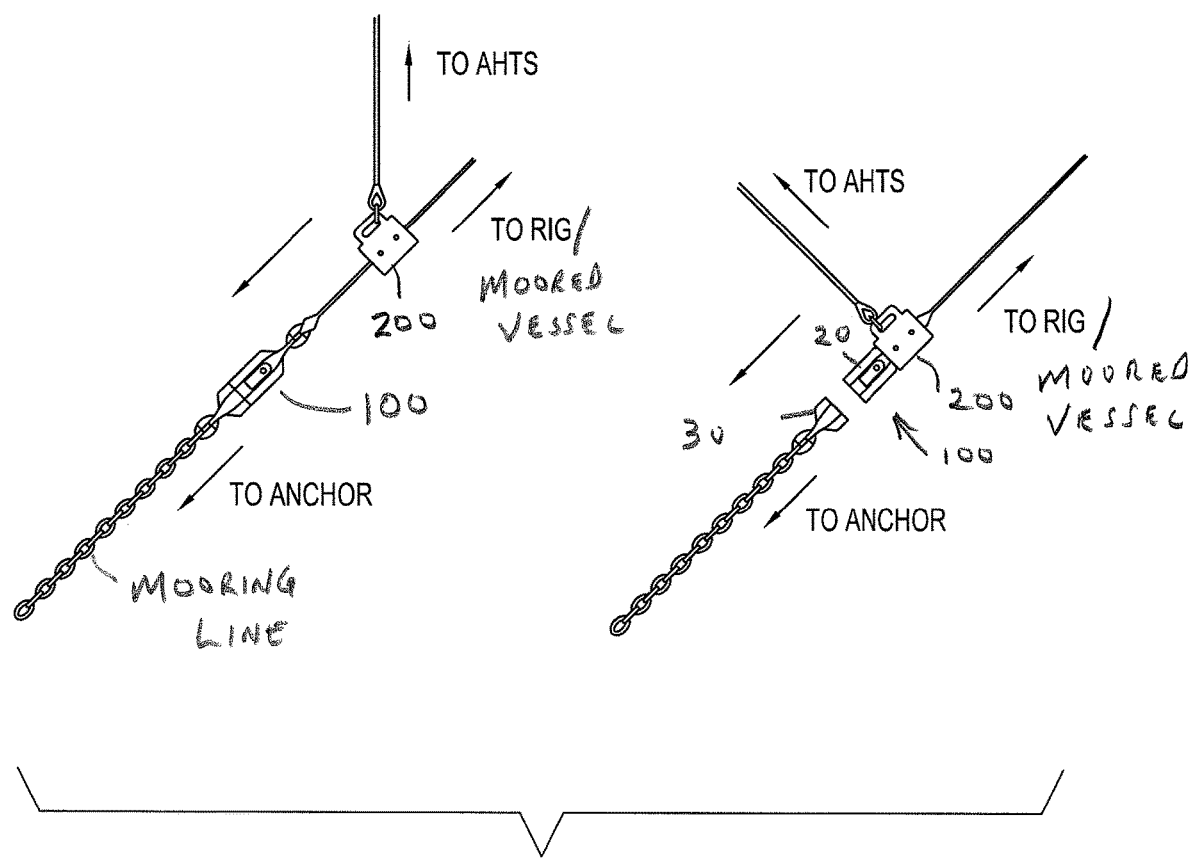

A third embodiment of the release mechanism, embodying the principles of the present invention, is shown in FIGS. 7 and 8. This third embodiment shares a number of structural elements with the first and second embodiments disclosed above, and additionally comprises a spring 19 disposed between shaft 14 and button 13, which biases button 13 toward its first, locked position.

Forces from shaft 14 are transmitted to button 13 by shear plate 12, connecting shaft 14 to button 13, and additionally by a spring 19 disposed between shaft 14 and button 13. As in the previously described embodiments, button 13 is thereby maintained in its first, locked position, which in turn keeps locking shoes 15 in their first, locked position, as in FIG. 7.

In this embodiment, the force on button 13 from shaft 14 (provided by internal assembly 18), shear plate 12 and/or spring 19 is overcome when the trigger rods 7 and 8 are pushed along main body 110, pivoting trigger arms 9, seen in FIG. 8. Trigger arms 9 push onto the button extension 11 and attached button 13 with sufficient force to shear shear plate 12, and in addition overcome the force from spring 19, permitting button 13 to move relative to shaft 14. Button 13 then moves to its second position, allowing locking shoes 15 to rotate to their second unlocked position as in FIG. 8, freeing first and second sections 20 and 30 from one another. As with the first two embodiments, trigger sleeve 200 may be used in combination with other elements to provide the opening force.

Note that the described embodiments of release mechanism 100 are not limited to those depicted and may incorporate any combination or variation of retaining mechanism, such as the internal assembly 18, shear plate 12, or spring 19. Note that as will be seen in the following description, the opening force may be provided by trigger sleeve 200, and/or by contact with a fairlead, hook, ring or collar, alone, or in combination with trigger sleeve 200. Generally, trigger sleeve 200 may comprise any form of element (generally, but not exclusively, that encircles a mooring line) that can be pulled into contact with release mechanism 100 so as to push trigger rods 7.

METHODS OF USE OF THE RELEASE MECHANISM

Three exemplary methods of use of the release mechanism, which may be used in connection with any of the above-disclosed embodiments, are depicted in FIGS. 9-20. Broadly, release mechanism 100 can be triggered either by pulling release mechanism 100 to the moored vessel, and thereby pulling release mechanism into contact with an anchor fairlead or similar structure (with or without an intervening apparatus, such as a trigger sleeve 200, between the release mechanism and the anchor fairlead), and thereby moving the trigger rods and releasing the release mechanism; or alternatively by pulling or dropping an apparatus down the mooring line and into contact with release mechanism 100, thereby moving the trigger rods and releasing the release mechanism as described above.

Figure 15:
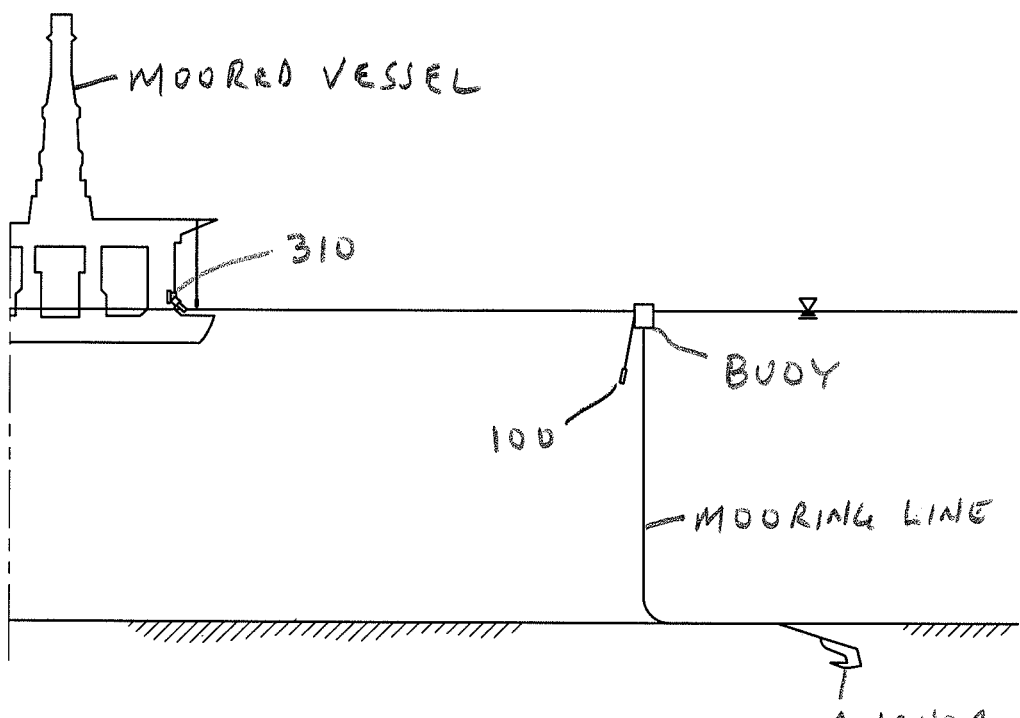

A first method, shown in FIGS. 9 and 12-15, utilizes a moored vessel's winch or similar device to retract or pull in the mooring line, causing release mechanism 100 to come into direct contact with a structure on the moored vessel, for example fairlead 310, or into contact with a trigger sleeve 200 disposed between release mechanism 100 and fairlead 310. As described above, as release mechanism 100 is pulled into contact with fairlead 310 or if present, trigger sleeve 200, trigger rods 7 and 8 are pushed or moved longitudinally along main body 110 of release mechanism 100, and the release sequence described above is implemented. FIGS. 9 and 12-15 show release mechanism 100 being pulled into contact with fairlead 310 or trigger sleeve 200, and release mechanism releasing (e.g. disconnecting into first and second sections 20 and 30). As can be seen in FIGS. 12-15, preferably a buoy is connected to the mooring line, the buoy having sufficient buoyancy to suspend one of the first and second sections 20 or 30 in the water column. After disconnection, as shown in FIG. 15, the buoy floats to the water's surface and can then be retrieved along with the attached section of release mechanism 100.

Figure 11:
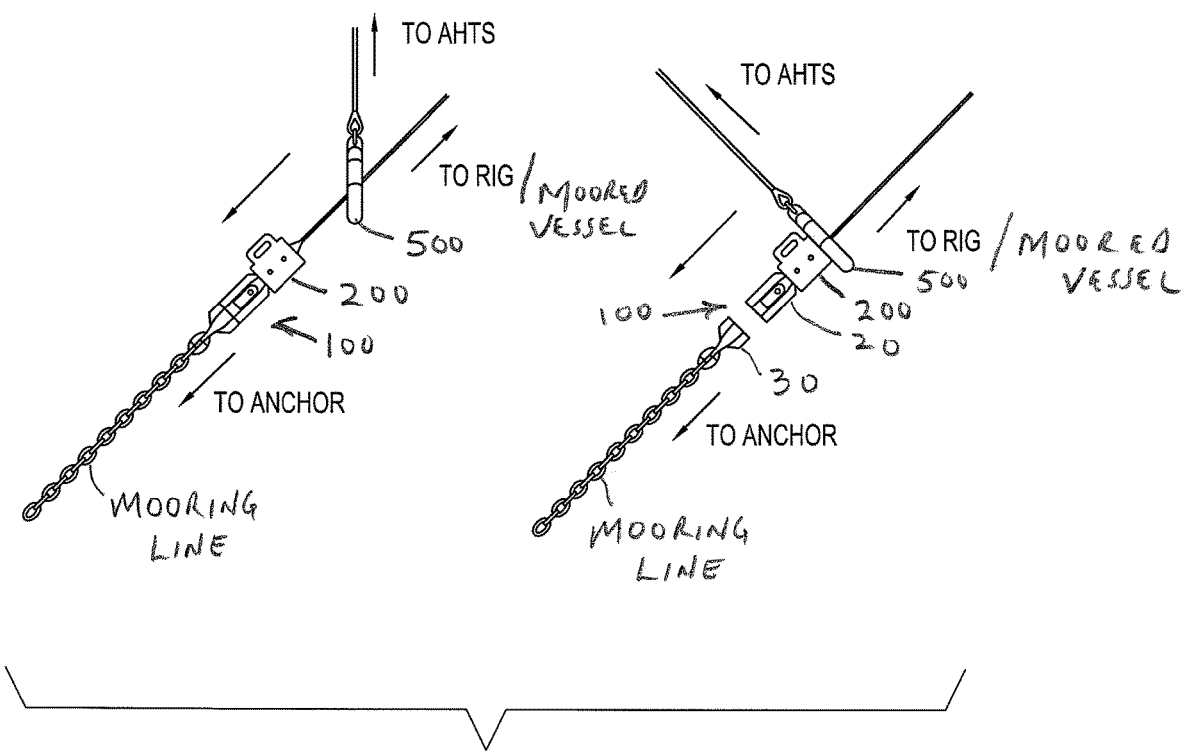
Figure 12:
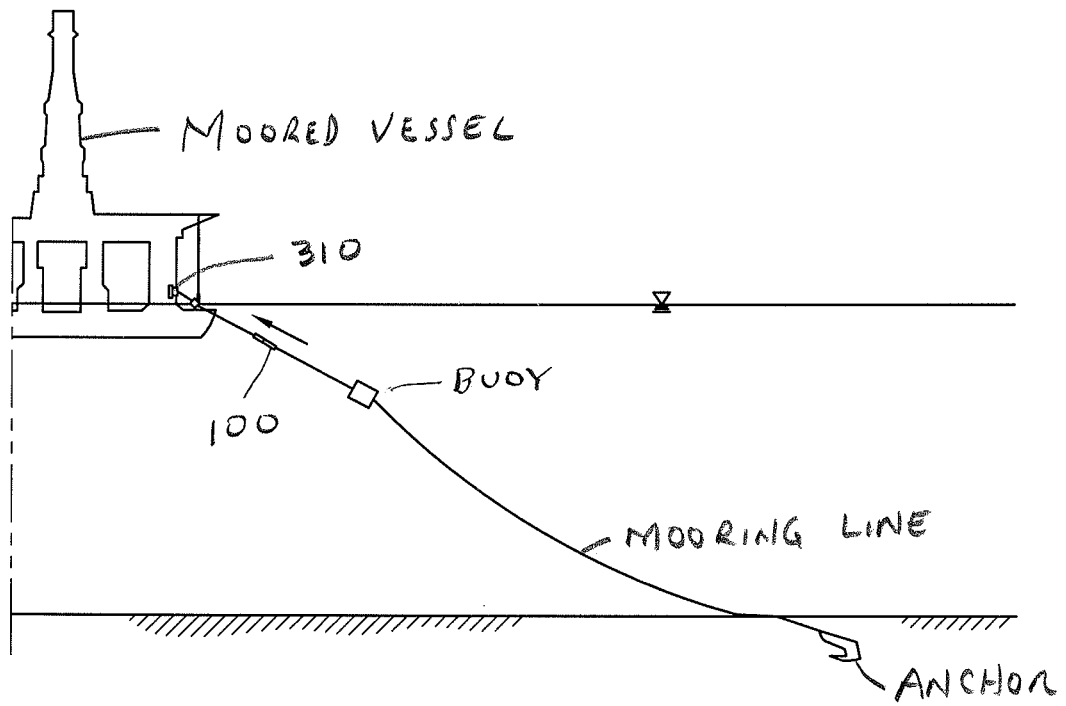
Figure 13:
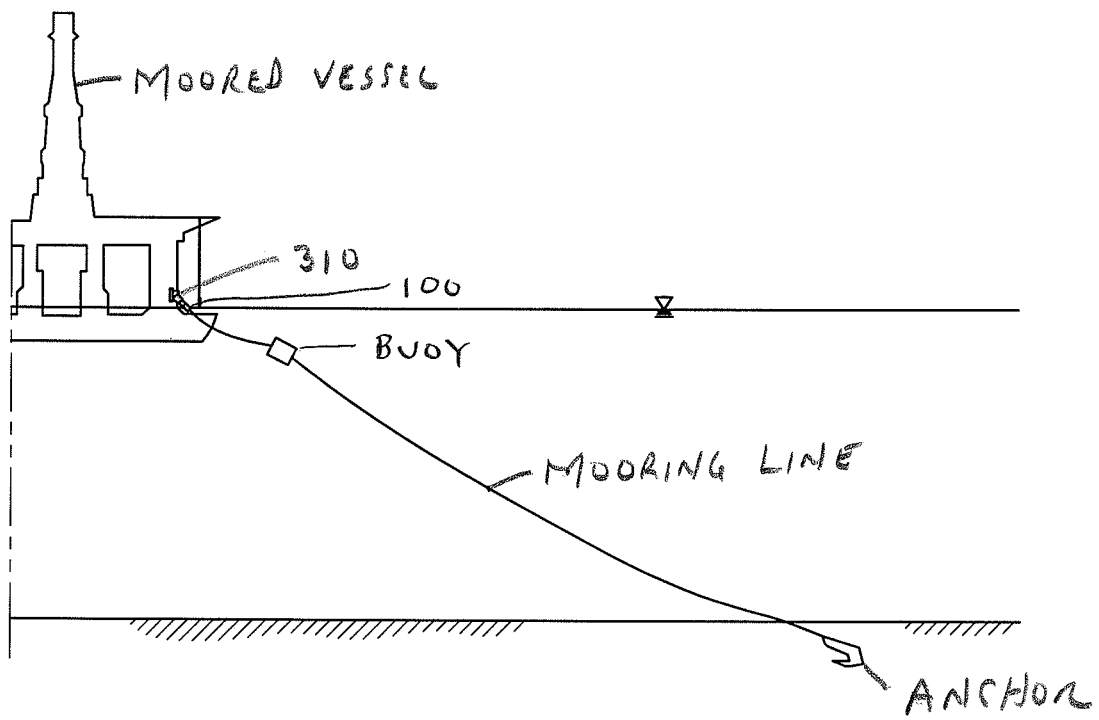
Figure 14:
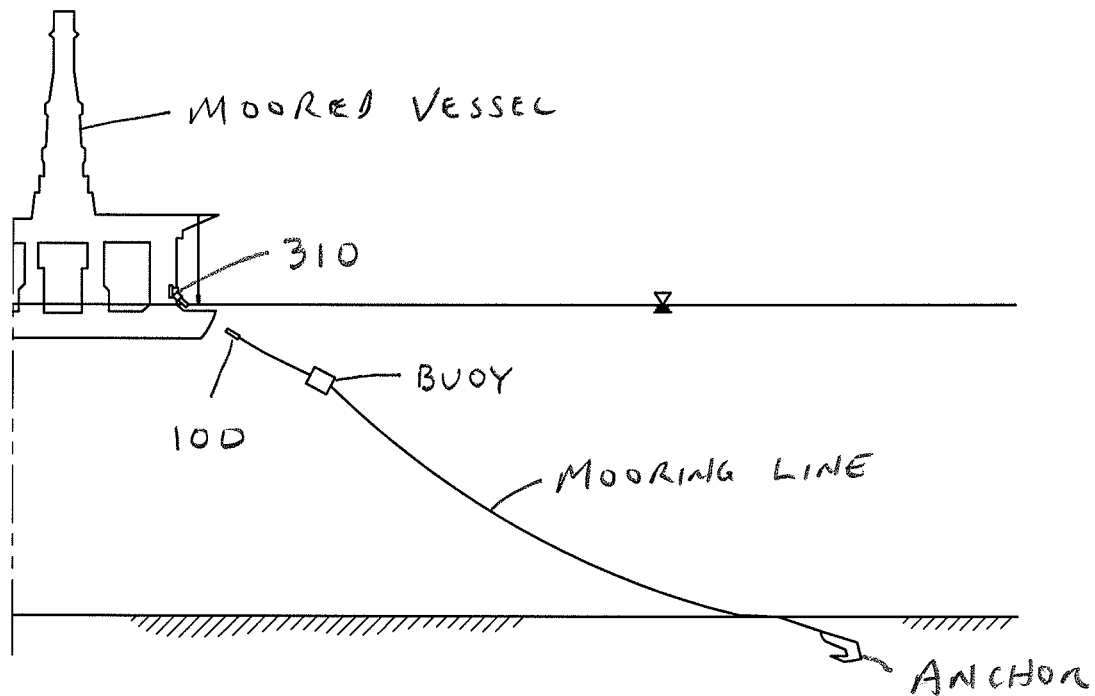
Figure 16:
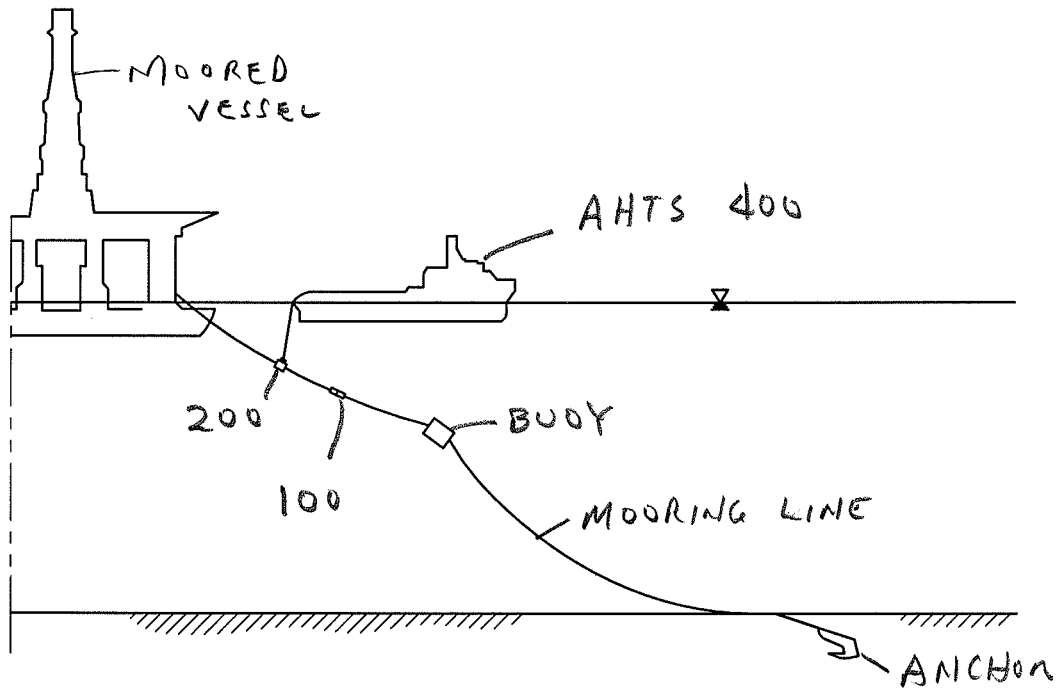
FIGS. 16 through 20 show another method of deployment of a release mechanism of the present invention.
Figure 17:
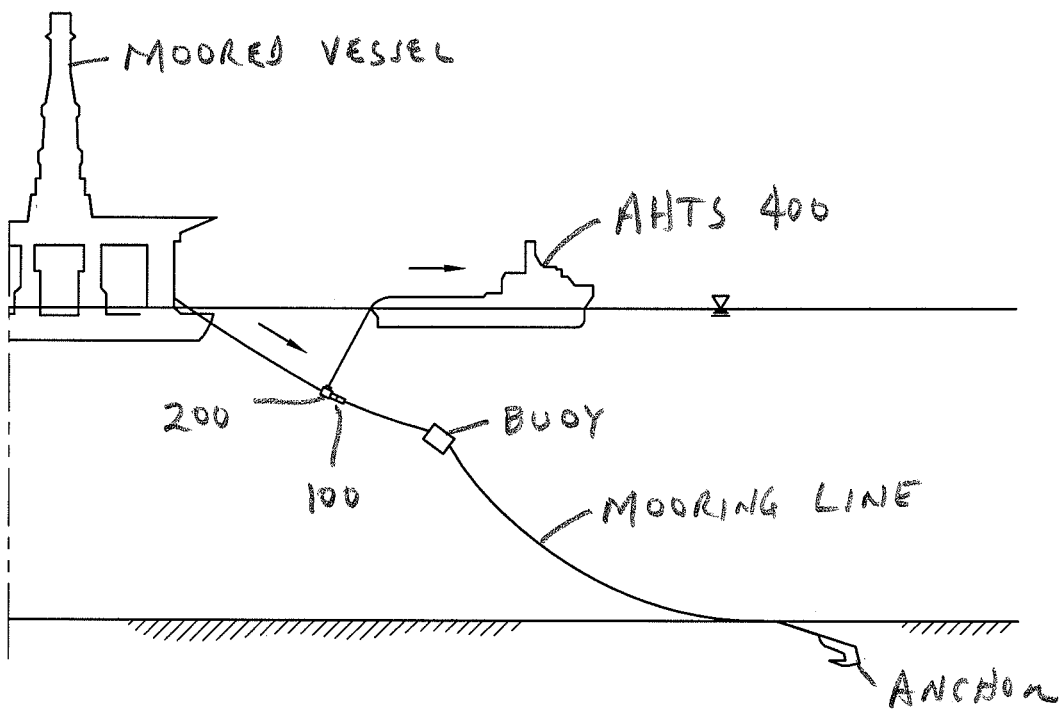

A second method as can be seen in FIGS. 10 and 16-20 utilizes an intervention vessel 400 (referred to as an "AHTS" or "AHV") to chase down the mooring line using some form of ring type element, such as trigger sleeve 200, to contact and trigger release mechanism 100, as best seen in FIGS. 10 and 16-20. Trigger sleeve 200 contacts release mechanism 100, and more particularly trigger rods 7, and with continued tension on the line connected to trigger sleeve 200 trigger rods 7 (and consequently 8) are pushed or moved longitudinally along main body 110 of release mechanism 100, and the release sequence described above is implemented. FIGS. 16 and 17 also illustrate the release sequence, showing the positions of the AHTS, the moored vessel, mooring line assembly, etc. It is understood that in lieu of a trigger sleeve 200, some other type of line-encircling element may be used, as shown in FIG. 11, such as a ring, collar, or hook 500. Fundamentally, trigger sleeve 200 or ring, collar, or hook 500 can take any form of encircling element which transfers force to trigger rods 7 in order to shift the mechanism and release the apparatus. The term trigger sleeve 200 may be used at times herein to globally reference these elements.

Figure 18:
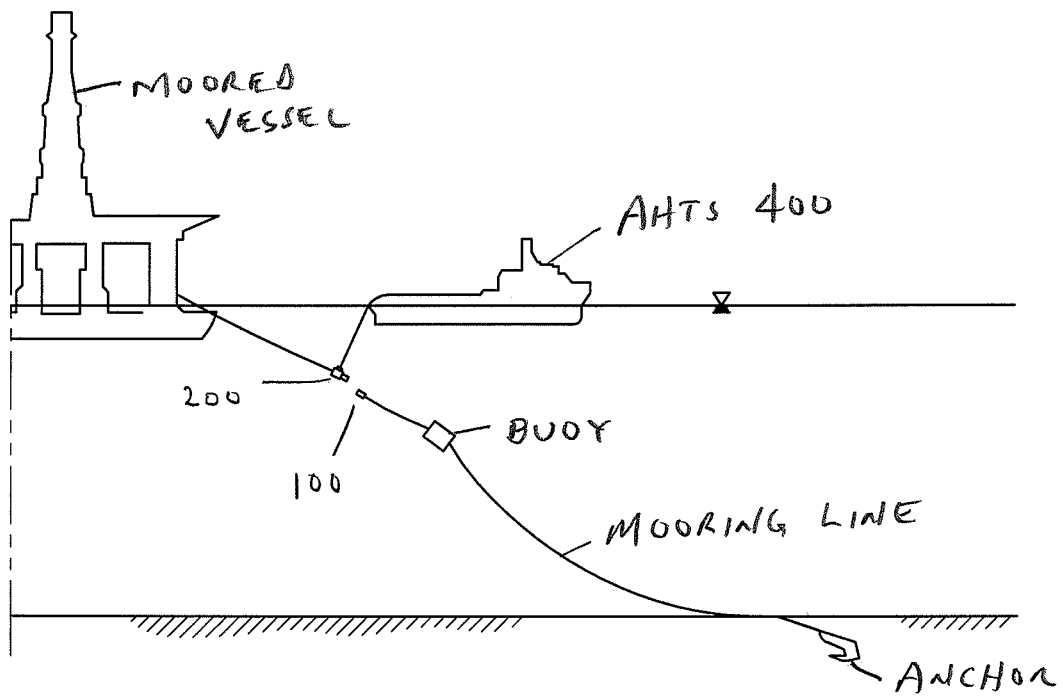
Figure 19:
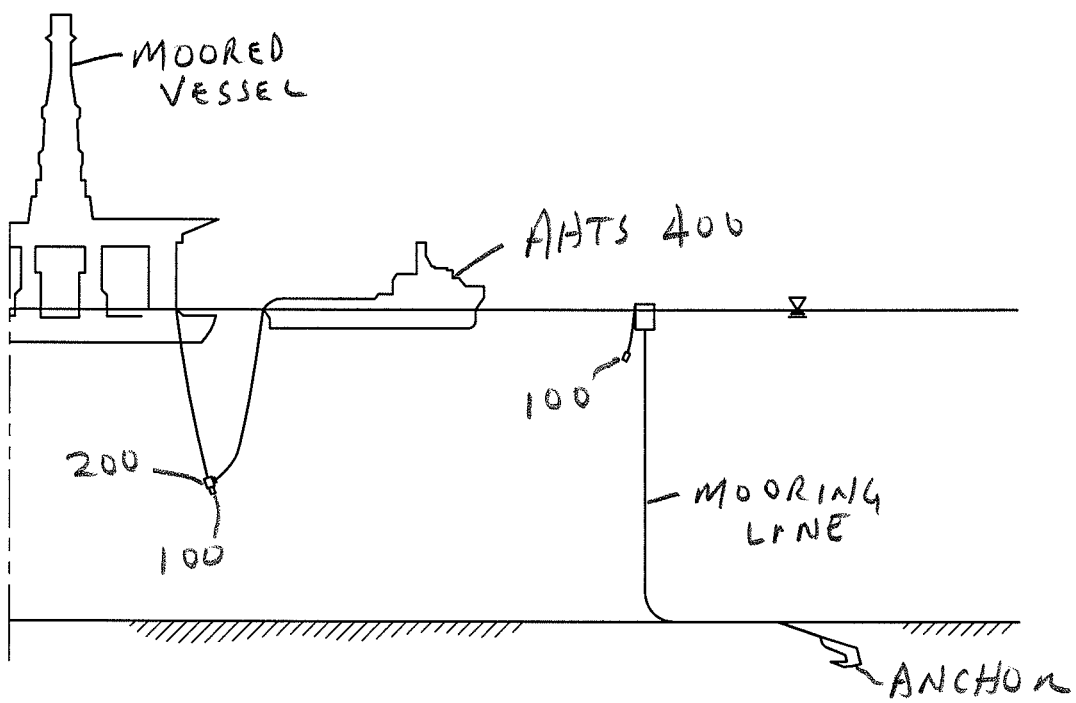
Figure 20:
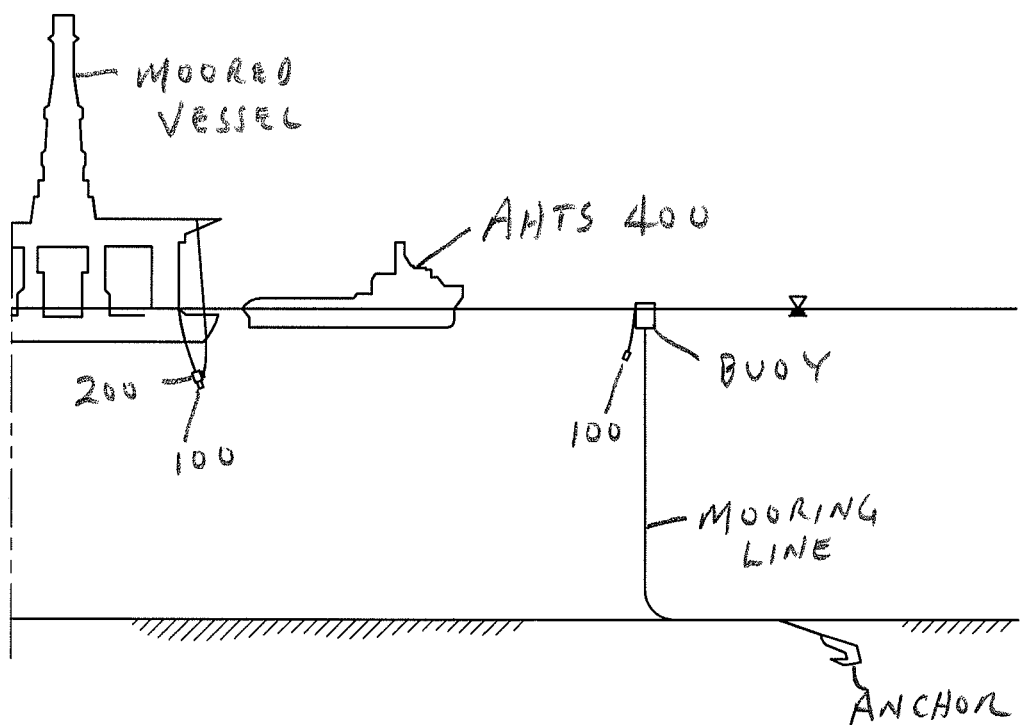

Further steps in the method are illustrated in FIGS. 18-20. Referring to FIG. 18, after disconnection of release mechanism 100, AHTS remains connected to the mooring line via trigger sleeve 200 and the line connecting to trigger sleeve 200. The anchor side of the mooring line preferably comprises a buoy thereon having sufficient buoyancy to suspend one section of release mechanism 100, hence after disconnection the buoy and section of release mechanism 100 assume the position shown in FIG. 19. The rig side of the mooring line, with the other section of release mechanism 100 attached, can then be pulled into the rig or moored vessel. The line connecting AHTS to trigger sleeve 200 can then be transferred to the moored vessel, by methods known in the art, as in FIG. 20. Typically, a plurality of mooring lines, release mechanisms, anchors, etc. are used to comprise an overall mooring assembly. It is understood that the above-described method is repeated for all mooring lines.

Variations of the above described disconnect methods may be implemented within the scope of the present invention. For example, the method described above and depicted in FIGS. 9 and 12-15 may be used for some of the mooring lines in an overall mooring assembly, with the AHTS-based method shown in FIGS. 10, 11, and 16-20 used for other of the mooring lines.

TELEMETRY-EQUIPPED RELEASE MECHANISM EMBODIMENT

Figure 21:
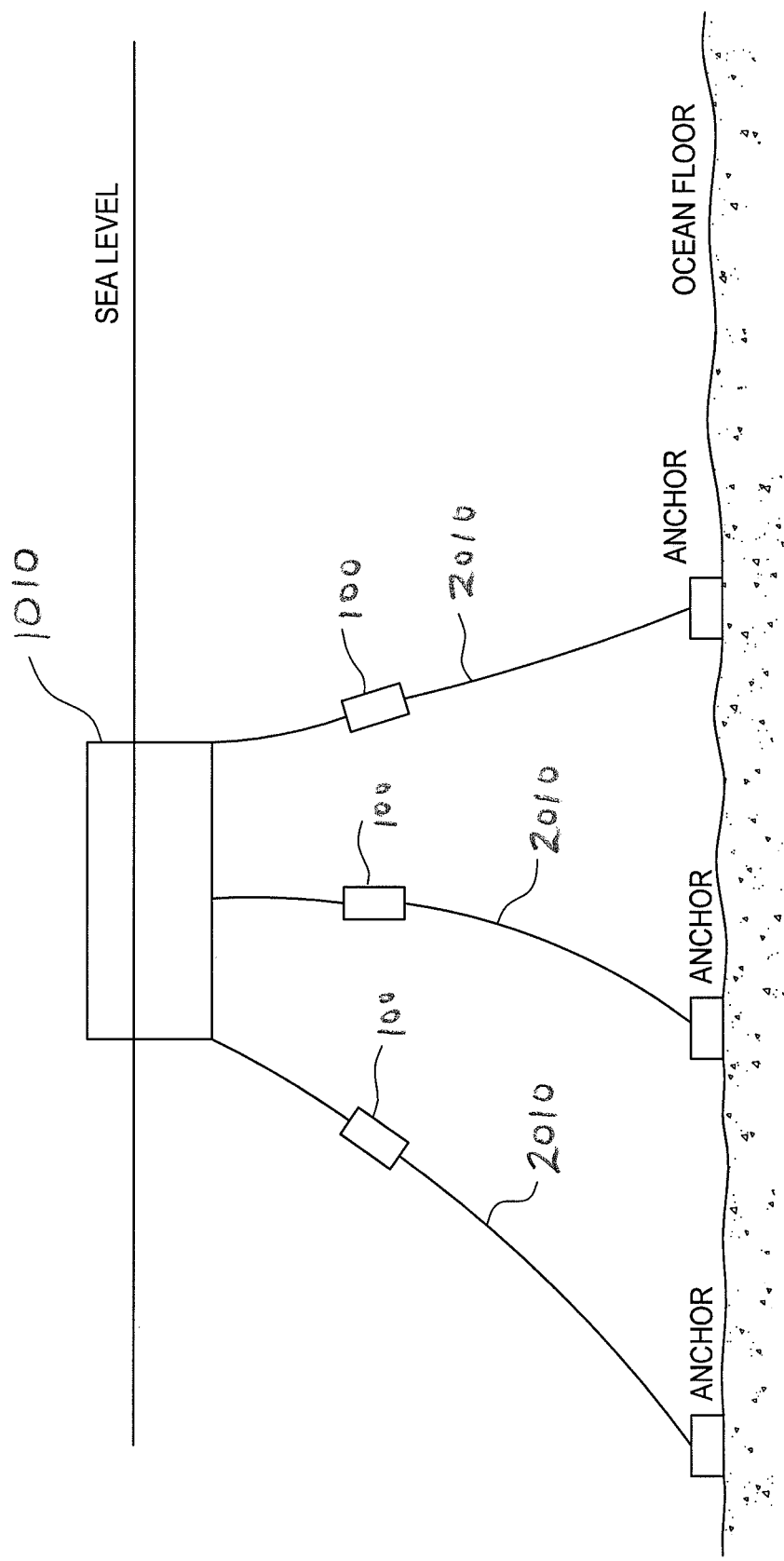
FIG. 21 depicts in schematic form the release mechanism of the present invention, further comprising a telemetry system.

The release mechanism described above may additionally comprise a telemetry system which measures and transmits information related to the release mechanism and its operation, to the moored vessel or another location. FIG. 21 represents, in schematical form, a telemetry equipped release mechanism system embodying the principles of the present invention. Vessel 1010, which may be a drilling rig, floating production system, or any other type of floating structure, typically but not exclusively in an offshore environment, is moored in place by a plurality of mooring line assemblies 2010. At least some of mooring line assemblies 2010 comprise release mechanisms 100, which may be as disclosed above, which enable remote disconnect of the vessel from its mooring; release mechanisms 100 essentially provide a means for remote parting of the mooring lines, to free vessel 1010 from its mooring. Exemplary release mechanisms are disclosed above.

Figure 22:
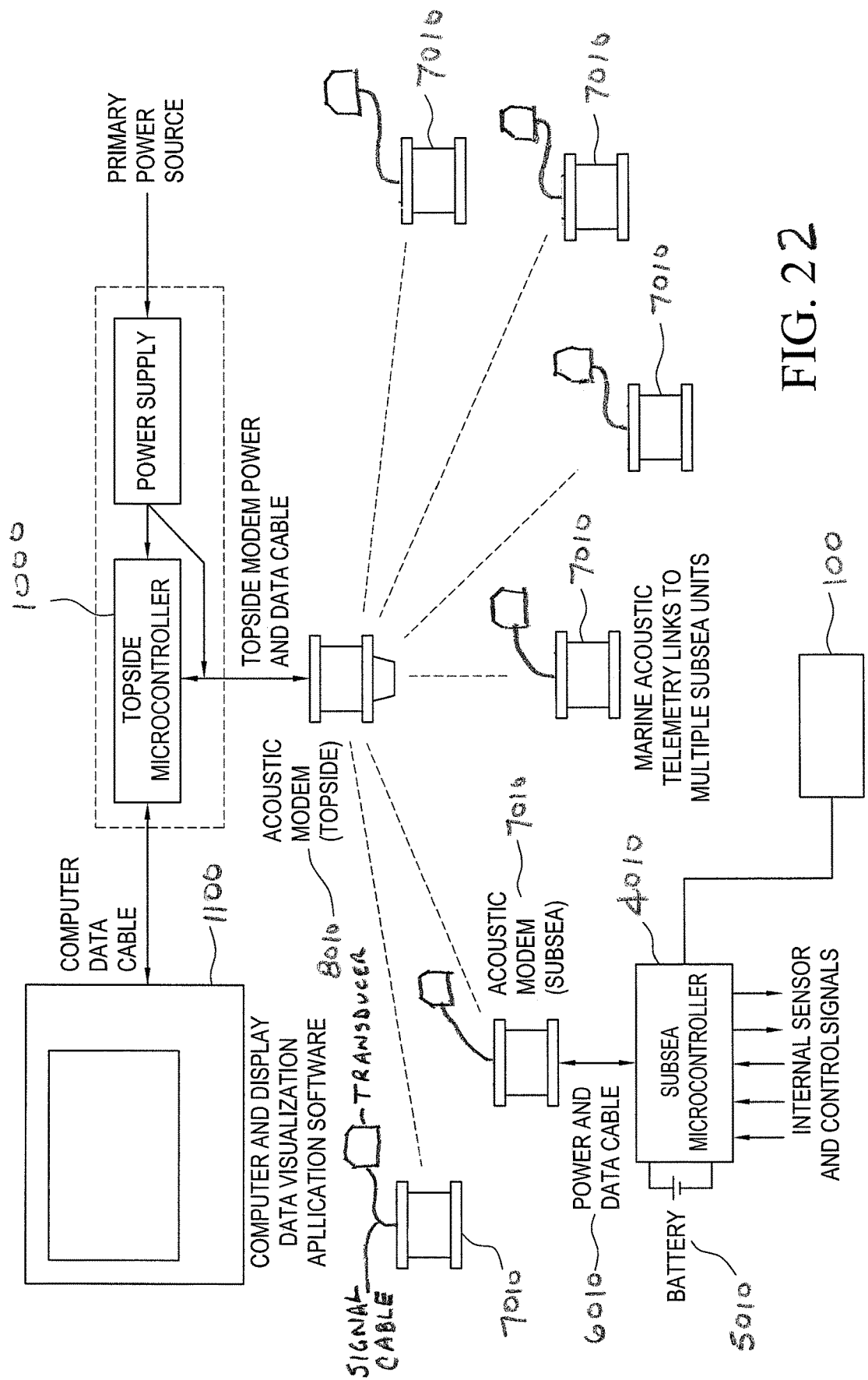
FIG. 22 shows further detail of the telemetry-equipped release mechanism of the present invention.

FIG. 22 is a schematic illustrating the key elements of the telemetry equipped release mechanism system. As can be readily understood, the system is integrated into the overall mooring assembly illustrated in FIG. 21.

Referring to FIG. 22, one or more release mechanisms 100, also denoted on FIG. 22 as "RARs," are deployed in the mooring line assemblies. Each release mechanism 100 comprises internal sensors (described more fully below), generating control signals. Release mechanism 100 further comprises a subsea microcontroller 4010, powered by battery 5010. A power and data cable 6010 connect release mechanism 100 to a subsea acoustic modem 7010. It is understood that FIG. 22 shows a plurality of subsea acoustic modems 7010, communicating with one or more topside acoustic modems 8010. Topside acoustic modem 8010 in turn communicates with a topside microcontroller 1000 (digital processor or PC computer), as shown. Microcontroller 1000 is connected to a computer display unit 1100 as shown, with data visualization application software as appropriate. Power supplies, batteries, connecting cables, software, and accessory items, etc. are provided as needed and as known in the relevant art.

In the preferred embodiment, a number of data types are acquired, stored, and transmitted via telemetry from release mechanism 100 to the subsea acoustic modem 7010, then to topside acoustic modem 8010 and on to topside microcontroller 1000. By way of example and not limitation, data related to strain (tension), depth, and tilt at release mechanism 100 is so acquired, stored, and transmitted. Additional sensors may be installed to acquire, store and transmit other data regarding the release mechanism status.

Measurement data from each sensor is stored in a data acquisition unit located in release mechanism 100 and transmitted via subsea and topside acoustic modems 7010 and 8010, to the topside microcontroller 1000, typically in a control room on vessel 1010.

Preferably, communication and control functions are implemented as application software running on topside microcontroller 1000. The telemetry controller application and other system components are capable of receiving and managing data from multiple release mechanisms 100, for example up to sixteen release mechanisms 100. Data from each release mechanism 100 is reformatted and transmitted to the computer display unit 1100.

The system is capable of acquiring, storing, and transmitting multiple types of data, including but not limited to:
mechanical strain (tension) on the body of release mechanism 100
operating depth of release mechanism 100
vertical tilt angle of release mechanism 100
diagnostic "red flag" data, transmitted along with the measurement data above, to signal the operator of operational issues with the system, including but not limited to (a) leaking or flooding within release mechanism 100; (b) that the hydraulic accumulator pressure within release mechanism 100 is low; (c) that the actuator assembly 18 within release mechanism 100 is unlocked; (d) battery voltage is low; (e) battery run time is high.

It is understood that other types of data may be acquired and transmitted as well.

In a preferred embodiment, in order to conserve battery power, different data polling rates may be used depending upon the ongoing operation. For example, while the system is deployed, a relatively fast data polling rate may be employed, with more-or-less continuous activation of the data acquisition unit and subsea acoustic modems. By way of example, during fast polling, the time required to poll eight release mechanisms is on the order of one minute, determined by (1) distance between the acoustic modems; (2) amount of data transmitted; and (3) environmental factors including acoustic noise sources.

In contrast, slow data polling may be employed during normal, long term operation. Generally, the data acquisition unit and subsea acoustic modems are placed in an inactive state to conserve battery power, for example as much as a 2 hour response time for each release mechanism.

In the preferred embodiment, the telemetry system herein described is independent from existing control systems governing the actual disconnect function of release mechanisms 100.

It is understood that the system herein described may generally employ commercially available components for the acoustic modem and transducers; the release mechanism internal sensors; the data acquisition unit, batteries; topside acoustic modem, transducer and cable assemblies; and topside microcontroller. Software is provided as required to enable functioning of the system.

It should be further understood that the principles of the present invention apply equally to apparatus other than a release mechanism, which may be incorporated into a mooring line assembly. By way of example, all of the foregoing system components, including but not limited to the plurality of sensors to acquire, store and transmit data via the telemetry system, may be incorporated into a subsea swivel or a permanent mooring element, rather than into a release mechanism; in substance, a subsea swivel, permanent mooring element, or any other subsea mooring line element could be substituted for the release mechanism in the foregoing description. Various embodiments of the apparatus, particularly those for semi-permanent or permanent deployment, may comprise subsea exchangeable batteries (for example, via remotely operated vehicle or ROV), a large number of long-life batteries, etc.

CONCLUSION

It is understood that the scope of the invention is not limited to the exemplary embodiments shown herein. Various aspects of the invention may be changed to suit particular settings, for example to join sections of mooring lines of different types; materials and dimensions may be changed to suit particular settings.

Therefore, the scope of the present invention is not to be measured by the foregoing description, but by the appended claims and their legal equivalents.

We claim:

1. A release mechanism for separating sections of a mooring line assembly, comprising:
   a main body comprising first and second mating sections disconnectable along a line of disconnection, the end of each section having openings to which sections of a mooring line can be attached, each of said first and second sections having a transverse inwardly extending flange adjacent the line of disconnection;
   one or more movable locking shoes having a locking portion bridging said flanges and line of disconnection, said locking shoes having opposed surfaces for engaging said flanges, said shoes locking said first and second sections together when said opposed surfaces thereof are maintained in contact with said flanges;
   each of said shoes having an inwardly curved rocker portion at one end thereof adapted to contact side walls of the main body when moved radially outwardly, the outward movement of said rocker portion causing the locking portion to move radially inwardly and disengage the opposed surfaces of said locking portion from said flanges to thereby permit disconnection of said body sections;
   a button comprising an exterior cam surface located adjacent said locking shoes and in a first position holding said locking portion of said locking shoes in contact with said flanges, said cam surface being adapted to contact and move said rocker portion radially outwardly and cause said locking portion of said locking shoes to move away from said flanges and thereby permit separation of said sections, when said cam surface is in a second position;
   a remotely operable acoustic internal assembly for moving said button between said first and said second positions, said internal assembly connected to said button by a shaft; and
   a mechanical means for moving said button from said first position to said second position, wherein said locking shoes can move to a second unlocked position and said first and second sections of said release mechanism can disconnect, said mechanical means operable by application of an external force to said mechanical means.

2. The release mechanism of claim 1, wherein said mechanical means for moving said button comprises:
   a pair of trigger rods disposed on said main body and longitudinally movable thereon;
   a pair of trigger arms rotatably mounted on said main body, one end of each of said trigger arms positioned proximal said button, the other end of each of said trigger arms disposed proximal one end of said trigger rods,
   whereby longitudinal movement of said trigger rods pushes one end of said trigger arms and rotates same into contact with said button, and whereby continued longitudinal movement of said trigger rods and said trigger arms moves said button to its second position wherein said locking shoes move to a second, unlatched position and said release mechanism disconnects.

3. The apparatus of claim 2, further comprising a shear plate disposed between said shaft and said button, whereby force applied by said trigger arms to said button may shear said shear plate and move said button to its second position, while said shaft remains in position.

4. The apparatus of claim 3, further comprising a spring disposed between said button and said shaft, said spring imparting an outwardly directed bias force to said button, whereby force applied by said trigger arms to said button may shear said shear plate, overcome said bias force and move said button to its second position, while said shaft remains in position.

5. The release mechanism of claim 4, wherein said trigger rods comprise two sections, one section on either side of said line of disconnection.

6. The release mechanism of claim 3, wherein said trigger rods comprise two sections, one section on either side of said line of disconnection.

7. The release mechanism of claim 2, wherein said trigger rods comprise two sections, one section on either side of said line of disconnection.

8. The release mechanism of claim 2, further comprising a ring type element disposed on said mooring line, and wherein said ring type element is moved into contact with said trigger rods, thereby moving said trigger rods.

9. The apparatus of claim 1, further comprising a spring disposed between said button and said shaft, said spring imparting an outwardly directed bias force to said button, whereby force applied by said trigger arms to said button may overcome said bias force and move said button to its second position, while said shaft remains in position.

10. The release mechanism of claim 9, wherein said trigger rods comprise two sections, one section on either side of said line of disconnection.

11. The release mechanism of claim 1, further comprising:
one or more sensors measuring data from the group comprising operating depth of said release mechanism, tension on said release mechanism, and vertical tilt angle of said release mechanism;
a subsea microcontroller adapted to receive and process said data; and
a subsea acoustic modem receiving said data from said subsea microcontroller and adapted to transmit said data to a topside acoustic modem disposed on a moored vessel.

12. A method for disconnecting mooring lines of a moored vessel, comprising the steps of:
a) providing a release mechanism comprising:
a main body comprising first and second mating sections disconnectable along a line of disconnection, an end of each section having openings to which sections of said mooring line can be attached, each of said first and second sections having a transverse inwardly extending flange adjacent the line of disconnection;
one or more movable locking shoes having a locking portion bridging said flanges and line of disconnection, said locking shoes having opposed surfaces for engaging said flanges, said shoes locking said first and second sections together when said opposed surfaces thereof are maintained in contact with said flanges;
each of said shoes having an inwardly curved rocker portion at one end thereof adapted to contact side walls of the main body when moved radially outwardly, the outward movement of said rocker portion causing the locking portion to move radially inwardly and disengage the opposed surfaces of said locking portion from said flanges to thereby permit disconnection of said body sections;
a button comprising an exterior cam surface located adjacent said locking shoes and in a first position holding said locking portion of said locking shoes in contact with said flanges, said cam surface being adapted to contact and move said rocker portion radially outwardly and cause said locking portion of said locking shoes to move away from said flanges and thereby permit separation of said sections, when said cam surface is in a second position;
a remotely operable acoustic internal assembly for moving said button between said first and said second positions, said internal assembly connected to said button by a shaft; and
a mechanical means for moving said button from said first position to said second position, wherein said locking shoes can move to a second unlocked position and said first and second sections of said release mechanism can disconnect, said mechanical means operable by application of an external force to said mechanical means;
wherein said mechanical means for moving said cam comprises: (i) a pair of trigger rods disposed on said main body and longitudinally movable thereon; (ii) a pair of trigger arms rotatably mounted on said main body, one end of each of said trigger arms positioned proximal said button, the other end of each of said trigger arms disposed proximal one end of said trigger rods, and (iii) whereby longitudinal movement of said trigger rods pushes one end of said trigger arm and rotates same into contact with said button, and whereby continued longitudinal movement of said trigger rods and said trigger arm moves said button to its second position wherein said locking shoes move to a second, unlatched position and said release mechanism disconnects;
b) installing said release mechanism in a subsea position in a mooring line, said mooring line extending from a moored vessel to an anchor, said moored vessel comprising a winch adapted to pull in said mooring line to said moored vessel, said moored vessel further comprising a mooring line fairlead through which said mooring line runs;
c) pulling in said mooring line until said trigger rods of said release mechanism are contacted by said fairlead, and continuing to pull said release mechanism until said trigger rods push on and rotate said trigger arms, and said trigger arms push said button to its second, unlocked position, in turn moving said locking shoes to their second, unlocked position; and
d) pulling said first and said second sections of said release mechanism apart, thereby disconnecting said mooring line.

13. A method for disconnecting mooring lines of a moored vessel, comprising the steps of:
a) providing a release mechanism comprising:
a main body comprising first and second mating sections disconnectable along a line of disconnection, an end of each section having openings to which sections of said mooring line can be attached, each of said first and second sections having a transverse inwardly extending flange adjacent the line of disconnection;
one or more movable locking shoes having a locking portion bridging said flanges and line of disconnection, said locking shoes having opposed surfaces for engaging said flanges, said shoes locking said first and second sections together when said opposed surfaces thereof are maintained in contact with said flanges;
each of said shoes having an inwardly curved rocker portion at one end thereof adapted to contact side walls of the main body when moved radially outwardly, the outward movement of said rocker portion causing the locking portion to move radially inwardly and disengage the opposed surfaces of said locking portion from said flanges to thereby permit disconnection of said body sections;
a button comprising an exterior cam surface located adjacent said locking shoes and in a first position holding said locking portion of said locking shoes in contact with said flanges, said cam surface being adapted to contact and move said rocker portion radially outwardly and cause said locking portion of said locking shoes to move away from said flanges and thereby permit separation of said sections, when said cam surface is in a second position;
a remotely operable acoustic internal assembly for moving said button between said first and said second positions, said internal assembly connected to said button by a shaft; and
a mechanical means for moving said button from said first position to said second position, wherein said locking shoes can move to a second unlocked position and said first and second sections of said release mechanism can disconnect, said mechanical means operable by application of an external force to said mechanical means;
wherein said mechanical means for moving said cam comprises: (i) a pair of trigger rods disposed on said main body and longitudinally movable thereon; (ii) a pair of trigger arms rotatably mounted on said main body, one end of each of said trigger arms positioned proximal said button, the other end of each of said trigger arms disposed proximal one end of said trigger rods, and (iii) whereby longitudinal movement of said trigger rods pushes one end of said trigger arm and rotates same into contact with said button, and whereby continued longitudinal movement of said trigger rods and said trigger arms moves said button to its second position wherein said locking shoes move to a second, unlatched position and said release mechanism disconnects;

b) installing said release mechanism in a subsea position in a mooring line, said mooring line extending from a moored vessel to an anchor;

c) installing a trigger sleeve around said mooring line between said moored vessel and said release mechanism, with a line running from said trigger sleeve to an intervention vessel d) with said intervention vessel, pulling said trigger sleeve into contact with said trigger rods on said release mechanism, and continuing to pull said trigger sleeve until said trigger rods push on and rotate said trigger arms, and said trigger arms push said button to its second, unlocked position, in turn moving said locking shoes to their second, unlocked position; and d) pulling said first and said second sections of said release mechanism apart, thereby disconnecting said mooring line.

14. A mooring line release apparatus, comprising:
a main body having first and second mating sections disconnectable along a line of disconnection, an end of each section adapted to attach a section of mooring line thereto, the main body comprising:
an acoustically operable release mechanism adapted to disconnect said first and second mating sections; and
a mechanically operable release mechanism adapted to disconnect said first and second mating sections by an external force applied to said main body without the use of a subsea remotely operated vehicle,
whereby said acoustically operable release mechanism and said mechanically operable release mechanism are both disposed at least partially within said main body, and
wherein disconnection of said first and second mating sections is along said line of disconnection, when either said acoustically operable release mechanism or said mechanically operable release mechanism is actuated.

15. The mooring line release apparatus of claim 14, wherein said apparatus is disposed in a mooring line of a moored vessel, and said external force is applied by pulling said mechanically operable release mechanism into contact with said moored vessel.

16. The mooring line release apparatus of claim 14, wherein said apparatus is disposed in a mooring line of a moored vessel, and said external force is applied by a trigger sleeve being pulled into said mechanically operable release mechanism by an intervention vessel.

17. The mooring line release apparatus of claim 14, wherein said apparatus is disposed in a mooring line of a moored vessel and said external force is applied from said moored vessel.

18. The mooring line release apparatus of claim 14, wherein:
each of said first and second sections comprise a transverse inwardly extending flange adjacent the line of disconnection;
one or more movable locking shoes disposed within said main body, said locking shoes having a locking portion bridging said flanges and said line of disconnection, said locking shoes having opposed surfaces for engaging said flanges, said shoes locking said first and second sections together when said opposed surfaces thereof are maintained in contact with said flanges;
each of said shoes having an inwardly curved rocker portion at one end thereof adapted to contact the side walls when moved radially outwardly, the outward movement of said rocker portion causing the locking portion to move radially inwardly and disengage the opposed surfaces of said locking portion from said flanges to thereby permit disconnection of said body sections;
a button comprising an exterior cam surface located adjacent said locking shoes and in a first position holding said locking portion of said locking shoes in contact with said flanges, thereby locking said first and second sections together, and in a second position causing said locking shoes to move away from said flanges and thereby permit separation of said sections;
a pair of trigger rods disposed on said main body and longitudinally movable thereon;
a pair of trigger arms rotatably mounted on said main body, one end of each of said trigger arms positioned proximal said button, the other end of each of said trigger arms disposed proximal one end of said trigger rods,
whereby longitudinal movement of said trigger rods pushes one end of said trigger arms and rotates same into contact with said button, and whereby continued longitudinal movement of said trigger rods and said trigger arms moves said button to its second position wherein said locking shoes move to a second, unlatched position and said release mechanism disconnects.

19. The mooring line release apparatus of claim 18, wherein said apparatus is disposed in a mooring line of a moored vessel, and said longitudinal movement of said trigger rods is caused by pulling said mechanically operable release mechanism into contact with said moored vessel.

20. The mooring line release apparatus of claim 18, wherein said apparatus is disposed in a mooring line of a moored vessel, and said longitudinal movement of said trigger rods is caused by a trigger sleeve being pulled into said mechanically operable release mechanism by an intervention vessel.

21. The mooring line release apparatus of claim 18, wherein said apparatus is disposed in a mooring line of a moored vessel and said longitudinal movement of said trigger rods is caused by an external force applied from said moored vessel.

22. A method, comprising the step of:
a) positioning a mooring line release apparatus in the mooring line of a moored vessel, said apparatus comprising:
a main body having first and second mating sections disconnectable along a line of disconnection, an end of each section adapted to attach a section of mooring line thereto, the main body comprising:

an acoustically operable release mechanism adapted to disconnect said first and second mating sections; and a mechanically operable release mechanism adapted to disconnect said first and second mating sections by an external force applied to said main body without the use of a subsea remotely operated vehicle, whereby said acoustically operable release mechanism and said mechanically operable release mechanism are both disposed at least partially within said main body, and wherein disconnection of said first and second mating sections is along said line of disconnection, when either said acoustically operable release mechanism or said mechanically operable release mechanism is actuated.

23. The method of claim 22, further comprising the steps of:

b) applying an external force to said main body; and c) disconnecting said first and second mating sections.

24. The method of claim 23, wherein said step of applying an external force to said main body is carried out by pulling said mechanically operable release mechanism into contact with said moored vessel.

25. The method of claim 23, wherein said step of applying an external force to said main body is carried out by a trigger sleeve being pulled into said mechanically operable release mechanism by an intervention vessel.

26. The method of claim 23, wherein said step of applying an external force to said main body is carried out by an external force applied from said moored vessel.

\* \* \* \* \*